United States Patent
Tiruvannamalai et al.

(10) Patent No.: US 11,271,212 B1
(45) Date of Patent: Mar. 8, 2022

(54) ANODE FABRICATION BY PATTERN LAMINATION, ANODES MADE THEREBY, AND ELECTROCHEMICAL DEVICES INCORPORATING SUCH ANODES

(71) Applicant: SES Holdings Pte. Ltd., Singapore (SG)

(72) Inventors: Arunkumar Tiruvannamalai, Waltham, MA (US); Yongkyu Son, Bedford, MA (US); Daniel Rourke, Somerville, MA (US); Jacqueline Hong, Stoneham, MA (US)

(73) Assignee: SES Holdings Pte. Ltd., Singapore (SG)

( * ) Notice: Subject to any disclaimer, the term of this patent is extended or adjusted under 35 U.S.C. 154(b) by 0 days.

(21) Appl. No.: 17/314,797

(22) Filed: May 7, 2021

Related U.S. Application Data

(60) Provisional application No. 63/170,207, filed on Apr. 2, 2021.

(51) Int. Cl.
| | |
|---|---|
| *H01M 4/134* | (2010.01) |
| *H01M 4/04* | (2006.01) |
| *H01M 4/66* | (2006.01) |
| *H01M 4/74* | (2006.01) |
| *H01M 4/62* | (2006.01) |

(52) U.S. Cl.
CPC ......... *H01M 4/663* (2013.01); *H01M 4/0404* (2013.01); *H01M 4/623* (2013.01); *H01M 4/661* (2013.01); *H01M 4/74* (2013.01)

(58) Field of Classification Search
None
See application file for complete search history.

(56) References Cited

U.S. PATENT DOCUMENTS

| | | | |
|---|---|---|---|
| 2012/0321946 A1* | 12/2012 | Kim | H01M 50/463 429/211 |
| 2017/0110713 A1* | 4/2017 | Otsuka | H01M 4/13 |
| 2019/0267606 A1* | 8/2019 | Lee | H01M 4/04 |
| 2020/0091550 A1 | 3/2020 | Choi et al. | |

FOREIGN PATENT DOCUMENTS

| | | | |
|---|---|---|---|
| CN | 110612628 A | 12/2019 | |
| JP | 2011034918 A * | 2/2011 | |
| WO | WO-2013054593 A1 * | 4/2013 | H01M 50/54 |

* cited by examiner

*Primary Examiner* — Tracy M Dove
(74) *Attorney, Agent, or Firm* — Downs Rachlin Martin PLLC

(57) ABSTRACT

A method of forming anodes for electrochemical devices by laminating a metal foil to a current collector and creating anode-active-material patches, composed of the metal foil, that are spaced from one another by inter-patch regions, wherein each inter-patch region provides a location for forming one or more electrical tabs of the finished anodes. The method can further include applying conductive-coating patches to the current collector prior to laminating the metal foil to the current collector, wherein each conductive-coating patch corresponds to one of the anode-active-material patches. In some embodiments, the conductive-coating patches can assist with forming the anode-active-material patches and/or can improve the cycling performance of an electrochemical device made using anodes made therewith. Anodes containing anode-active material and conductive coatings applied to current collectors are also disclosed.

29 Claims, 7 Drawing Sheets

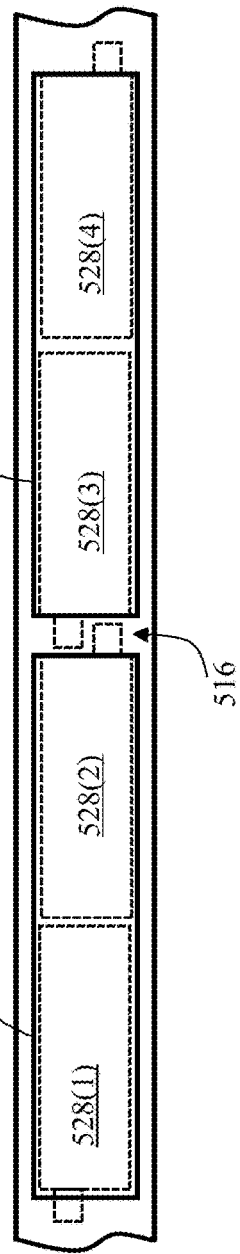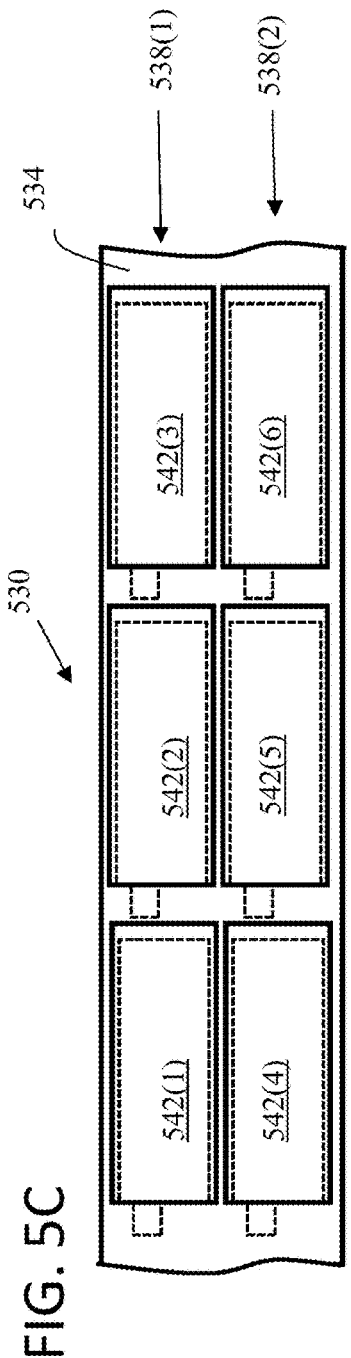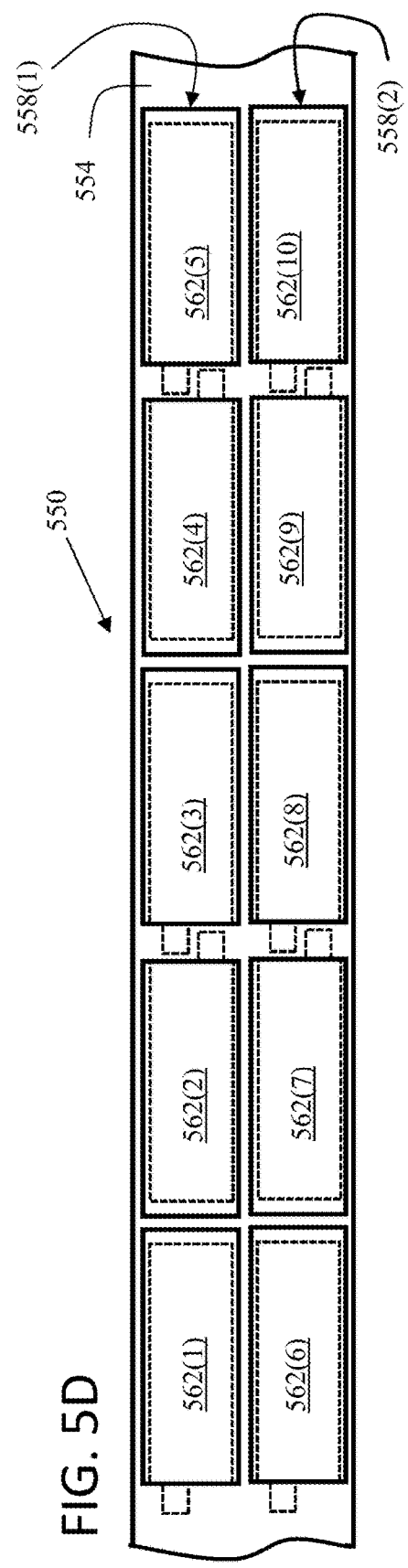

ANODE FABRICATION BY PATTERN LAMINATION, ANODES MADE THEREBY, AND ELECTROCHEMICAL DEVICES INCORPORATING SUCH ANODES

RELATED APPLICATION DATA

This application claims the benefit of priority of U.S. Provisional Patent Application Ser. No. 63/170,207, filed Apr. 2, 2021, and titled "ANODE FABRICATION BY PATTERN LAMINATION, ANODES MADE THEREBY, AND SECONDARY BATTERIES INCORPORATING SUCH ANODES", which is incorporated by reference herein in its entirety.

FIELD

The present disclosure generally relates to the field of electrochemical devices. In particular, the present disclosure is directed to anode fabrication by pattern lamination, anodes made thereby, and electrochemical devices incorporating such anodes.

BACKGROUND

Rechargeable, or secondary, lithium-metal batteries offer volumetric and gravimetric energy densities higher than current lithium-ion batteries. Unlike lithium-ion batteries, which contain anodes (negative electrode) formed from an intercalant material such as graphite, in typical secondary lithium-metal batteries, lithium foil (anode-active material) is laminated to both sides of a copper foil (current collector) to form the conventional lithium-copper-lithium (Li/Cu/Li) anode structure. However, lithium is soft and sticky, and it is difficult by conventional roll-milling processes to produce ultra-thin (<50 um thick) lithium foil having width more than 120 mm. That width constraint consequently limits the size of the anode and cells that can be built using lamination techniques.

FIGS. 1A and 1B illustrate a conventional approach to producing conventional Li/Cu/Li anodes (represented by dashed line regions 10) using a roll-to-roll process 12 involving continuous lamination of ultra-thin lithium-foil ribbons 14A and 14B on both sides of a copper-foil web 16 to form a webbed anode precursor 18. The width, Ww, of the copper-foil web 16 is usually wider than the width, Wf, of the lithium foil, and the laminated structure typically has a bare copper region 16A along at least one edge of the copper-foil web. The bare copper region 16A is provided for forming electrical tabs 10A for enabling electrical contact to the Li/Cu/Li anodes 10 that are stamped out from the webbed anode precursor 18 when the Li/Cu/Li anodes are assembled into a stacked "jellyroll" of an electrochemical cell. Without the electrical tabs 10A, it would be difficult to connect multiple layers of the Li/Cu/Li anodes 10 in the stacked jellyroll to an external electrical lead (not shown) in the finished electrochemical cell. As mentioned above, due to the physical properties of lithium the width Wf of the lithium-foil web 16 is limited to about 120 mm when using the desired ultra-thin lithium foil, and this limits the size of the Li/Cu/Li anodes, such as the Li/Cu/Li anodes 10 of FIGS. 1A and 1B, that can be made using conventional roll-to-roll lamination techniques, which correspondingly severely limits the size of lithium-metal electrochemical cells (not shown), for example, secondary lithium-metal-battery cells, that can be made with ultra-thin-lithium-metal anodes. In turn, this limitation hampers development of lithium-metal secondary cells for applications that require high-capacity batteries for practicable operation, such as electric vehicles, among others.

SUMMARY OF THE DISCLOSURE

In an implementation, the present disclosure is directed to a method of forming anodes for one or more electrochemical devices, wherein each of the anodes has an electrical tab. The method includes providing a current-collector web; laminating, on a first side of the current-collector web, a metal foil to the current-collector web as multiple anode-active-material patches spaced from one another so as to provide a webbed anode precursor that includes the anode-active-material patches and inter-patch regions not containing the metal foil; and forming the anodes from the webbed anode precursor so that each anode is formed from a corresponding anode-active-material patch and the corresponding electrical tab is formed from one of the inter-patch regions, wherein forming the anodes includes separating the anodes from the webbed anode precursor.

BRIEF DESCRIPTION OF THE DRAWINGS

For the purpose of illustrating aspects of the disclosure, the drawings illustrate features and/or characteristics of one or more embodiments of the disclosure. However, it should be understood that the present disclosure is not limited to the precise arrangements and instrumentalities shown in the drawings, wherein:

FIGS. 5A through 5E are plan views of portions of differing webbed anode precursors illustrating examples of alternative arrangements of anode regions and anode-active-material patches (and conductive-coating patches, if used) on the webbed anode precursors;

DETAILED DESCRIPTION

Figure 1B:
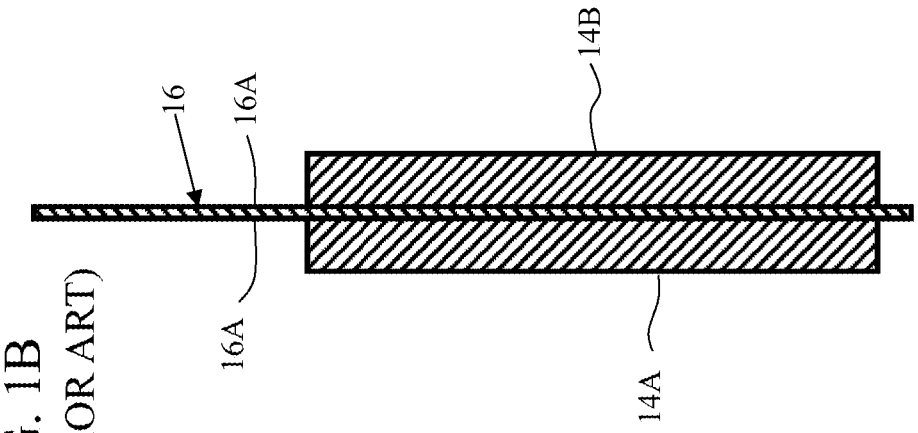
FIG. 1B is an enlarged exaggerated cross-sectional view of the conventional Li/Cu/Li webbed anode precursor as taken along line 1B-1B of FIG. 1A before the anodes are punched from the webbed anode precursor.
Figure 1A:
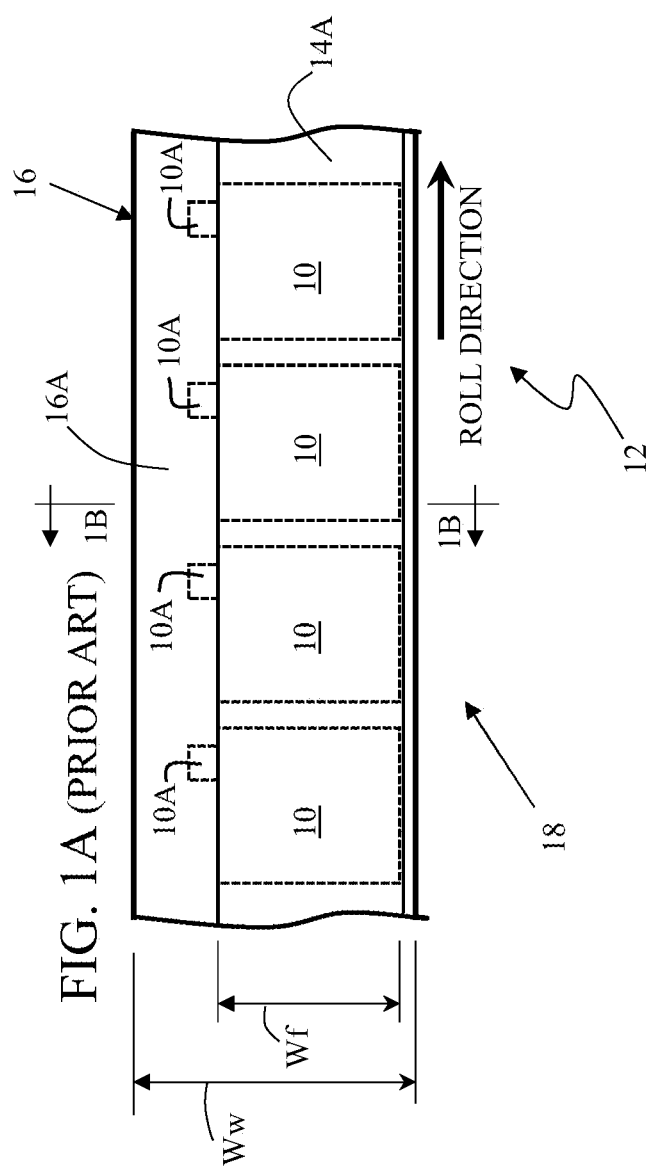
FIG. 1A is a plan view of a portion of a conventional webbed anode precursor in a conventional roll-to-roll lamination process, illustrating Li/Cu/Li anodes prior to the Li/Cu/Li anodes being punched from the webbed anode precursor.

In some aspects, the present disclosure is directed to methods of forming anodes for one or more electrochemical devices using certain lamination techniques. Examples of electrochemical devices that can benefit from an anode-forming lamination method of the present disclosure include metal-based secondary batteries and supercapacitors, among others. In this context, "metal-based" means that the electrochemical device at issue has one or more anodes that each comprise at least one metal layer that is the anode-active material. Examples of metals that can be used for the metal layer include, but are not limited to, lithium, sodium, potassium, magnesium, and aluminum, or an alloy containing such metal(s), among others. As discussed below, in some embodiments, anode-forming lamination methods of the present disclosure allow metal anodes, especially alkali-metal anodes, such as lithium-metal anodes, to be made in sizes larger than conventionally laminated anodes made using the same anode-active metal. Such larger sizes translate, for example, into higher capacity secondary batteries that overcome limitations of conventional secondary batteries. As those skilled in the art will readily appreciate, lamination techniques disclosed herein can be cost effective, and cost of manufacturing is a particularly important parameter for manufacturing large-capacity secondary batteries needed for high-energy-demand applications, such as electric vehicles.

In some aspects, the present disclosure is directed to anodes that include a current collector, a metal anode-active layer on one or both sides of the current collector, and an electrically conductive coating (or simply "conductive coating") located between the current collector and each metal anode-active layer. In some embodiments, the conductive coating is a conductive-carbon-based coating, which may include one or more forms of conductive carbon, a binder, and optionally particles of one or more metals. In other embodiments, the conductive coating can include only particles of one or more metals and a binder. In some embodiments, the conductive coating improves the securement of the alkali-metal layer to the current collector. For example, those skilled in the art will appreciate that, in conventionally produced laminated anodes, the lithium-metal layers applied to copper current collectors do not always bond well to the copper current collectors, causing them to delaminate from the copper current collectors during handling. Using a conductive coating of the present disclosure can prevent this delamination. A conductive coating of the present disclosure can also function to maintain contact with the lithium-metal layer when the lithium-metal layer is mostly converted to a porous mossy structure upon cycling. Using a conductive coating of the present disclosure can also assist in locating metal-foil sheets of anode active material on a current collector web and/or allow for new manufacturing techniques that leverage the excellent adhesive properties of some embodiments of the conductive coating. Metal-based anodes of the present disclosure that include a conductive coating can be made using any suitable method, such as any one of the anode-forming lamination methods disclosed herein or any suitable conventional methods.

In still other aspects, the present disclosure is directed to methods of making an electrochemical device using any of the methods disclosed herein and/or using any of the conductive-coating-containing anodes disclosed herein and electrochemical devices made using a method of the present disclosure and/or using any of the conductive-coating-containing anodes disclosed herein. The foregoing and other aspects of the present disclosure are described in detail below.

Before proceeding with more-detailed descriptions, it is noted that throughout the present disclosure, the term "about", when used with a corresponding numeric value, refers to ±20% of the numeric value, typically ±10% of the numeric value, often ±5% of the numeric value, and more often ±2% of the numeric value. In some embodiments, the term "about" can mean the numeric value itself. It is also noted that the term "side" when referring to an anode, layer, coating, foil, web, ribbon, or any other component, or region thereof, of an anode of the present disclosure or any other structure, or region thereof, used to form an anode of the present disclosure refers to the expanse of the component or structure that extends between edges of that component or structure in a direction perpendicular to the thickness of that component or structure. In other words, in the context of the present disclosure, the "sides" of a component or structure are separated by the thickness of the component or structure.

Figure 2:
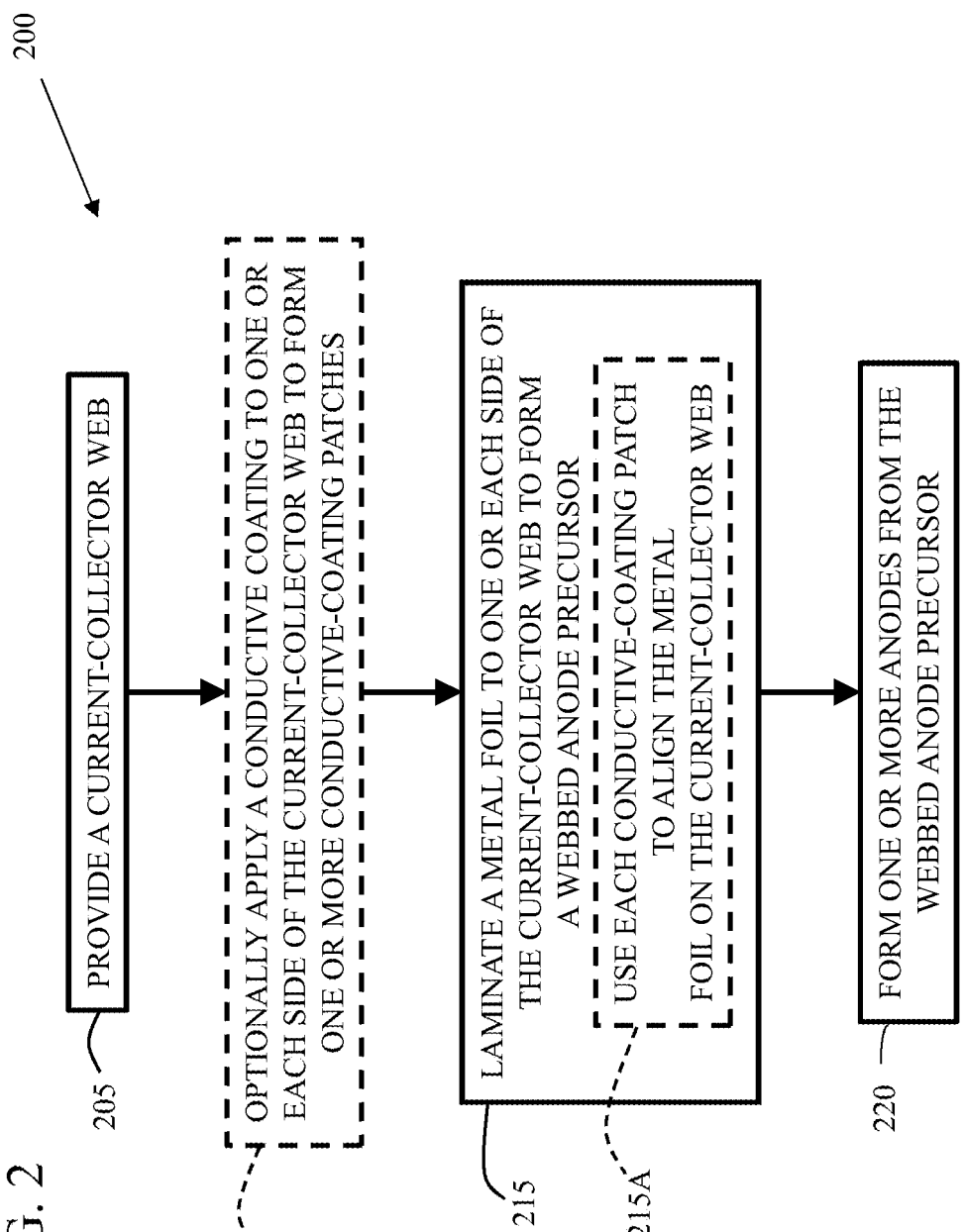
FIG. 2 is a flow diagram illustrating an example anode-forming lamination method of the present disclosure.
Figure 3:
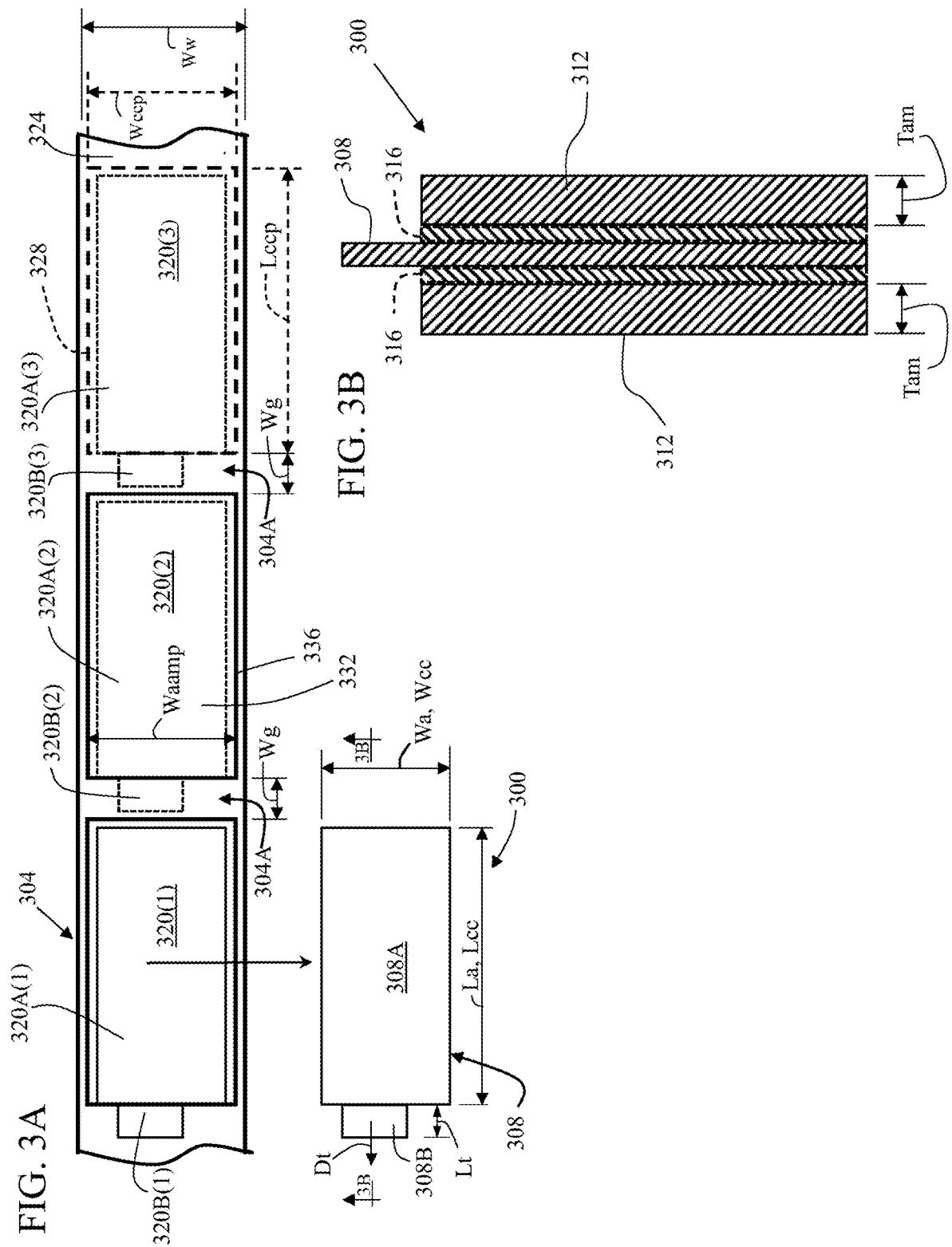
FIG. 3A is a partial plan view of an example webbed anode precursor and an example anode removed therefrom that can be made using the method of FIG. 2, with the webbed anode precursor shown in differing stages of processing, from application of an optional conductive-coating patch, to laminating of an anode-active-material patch, to removal of the anode from the webbed anode precursor.
FIG. 3B is an enlarged exaggerated cross-sectional view of the example anode of FIG. 3A as taken along line 3B-3B of FIG. 3A.
Figure 4:
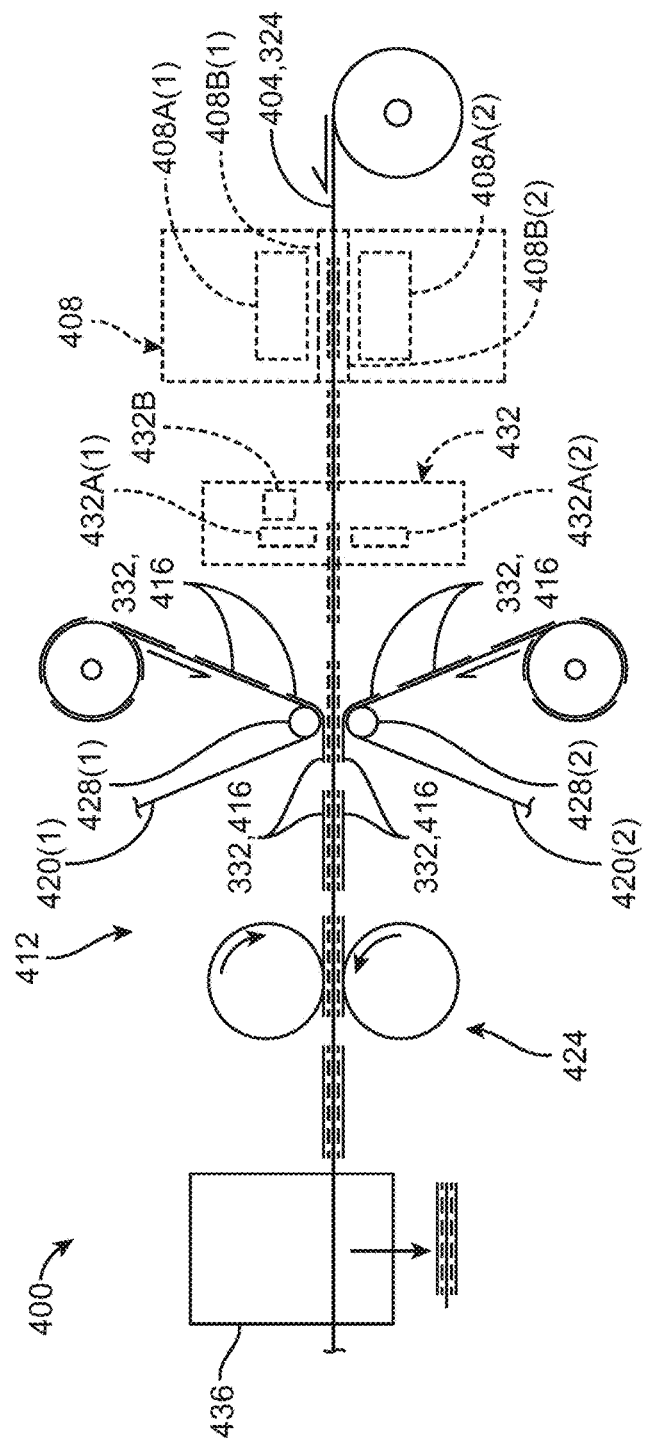
FIG. 4 is a high-level schematic view of an example roll-to-roll lamination process implementing the example anode-forming lamination method of FIG. 2.

Referring now to FIGS. 2, 3A, 3B and 4, and correspondingly noting that the first digit of each element numeral corresponds to the figure where that element is first shown, FIG. 2 illustrates an example anode-forming lamination method 200 of forming anodes 300 (only one shown detached) for one or more electrochemical device (not shown), FIGS. 3A and 3B illustrate a webbed anode precursor 304 and the anode 300 made using the method, and FIG. 4 illustrates an example roll-to-roll (R2R) processing system 400 for performing various steps of the anode-forming lamination method 200. The anode-forming lamination method 200 may be used to form a plurality of anodes 300 that may all be the same size as one another or may have differing sizes. Each anode 300 includes a current collector 308 having an active-material region 308A and an electrically conductive tab, or just "tab", 308B formed as an extension of the active-material region. The active-material region 308A contains an anode-active material 312 laminated to the anode 300 on one or both sides of the current collector 308, depending on the requirements for the anode design. The active-material region 308A has a length, La, in a direction parallel to the direction, Dt, of extension of the tab 308B from the active-material region, and the length La can be any suitable length, such as from about 50 mm to about 800 mm, from about 100 mm to about 600 mm, or about 100 mm or more, for example, when thickness, Tam of the active-material 312 is about 50 µm or less, in a range of about 15 µm to about 25 µm, or about 20 µm or less. The width, Wa, of the active-material region 308A in a direction perpendicular to the length La can likewise be any suitable width, such as from about 10 mm to about 200 mm, from about 20 mm to about 150 mm, or less than about 120 mm when, for example, the thickness Tam is about 50 µm or less, in a range of about 15 µm to about 25 µm, or about 20 µm or less. In some embodiments, the width Wa can be the maximum width of foil at a given thickness that can be formed from the chosen anode-active material using conventional foil-forming techniques, including widths greater than 200 mm. For example, the current maximum width for lithium foil is about 120 mm of a thickness of about 50 µm or less, but future technologies may allow for greater widths, and techniques disclosed herein can easily keep pace with those technologies.

Methods of the present disclosure enable production of lithium anodes, such as a lithium-based version of anode 300, with, for example, up to about 150 mm (Wa (FIG. 3A)) x about 600 mm (La (FIG. 3A)) in areal dimensions or larger when the thickness Tam is about 50 µm or less, especially if industry devises ways of manufacturing lithium foils having widths greater than 120 mm that is effectively the current limit. In an example, a conventional lamination process yielded Li/Cu/Li anodes of about 53 mm×45 mm in areal size at a lithium thickness of 20 µm, while a lamination method of the present disclosure, for example, lamination method 200 of FIG. 2, yielded anodes 300 having an active-area length La of 550 mm and an active-area width of 107 mm at the same lithium thickness (Tam). In proportion to the anode size, the cell capacity (Ah) and energy (Wh) will correspondingly be much higher (e.g., up to 25× higher, 50× higher, or more) for secondary batteries assembled with the anodes 300 made in accordance with the present disclosure, either with or without optional conductive-coating patches 328 (see below). Lithium-metal secondary batteries with a capacity more than 100 Ah that are required for high-energy-demand applications, such as electric vehicles, can be built using the disclosed methodologies. As an example comparison, for the same number of stack layers, a 53 mm×45 mm anode forms a ~4 Ah cell, while a 550 mm×107 mm anode will form a ~100 Ah cell. Additionally, as large cells require less packaging, the gravimetric and volumetric energy densities (Wh/Kg & Wh/L, respectively) of these batteries will also be higher. For example, in the foregoing example ~4 Ah versus ~100 Ah cells, there will be an increase in gravimetric energy density from about 400 Wh/kg to about 410 Wh/kg from the smaller cell to the larger cell.

In some embodiments, the anode 300 may include a conductive coating 316 between the anode-active material 312 and the current collector 308 on each side of the current collector where the anode-active material is present. It is usually desirable for the conductive coating 316, if present, and the anode-active material 312 to be about coextensive with the active-material region 308A, i.e., have the about same length, Lcc, and width, Wcc, as, respectively, the length La and the width Wa of the corresponding active-material region. As seen in FIG. 3A, anode 300 is shown as being removed from webbed anode precursor 304 having been removed from a corresponding anode region 320(1) of the webbed anode precursor. FIG. 3A also shows two additional anode regions 320(2) and 320(3) on the webbed anode precursor 304 that will yield two additional anodes (not shown) once removed from the webbed anode precursor. Each anode region 320(1) to 320(3) includes an active-region portion 320A(1) to 320A(3) and a tab portion 320B(1) to 320B(3). In FIG. 3A, the anode region 320(2) includes the active anode material and is ready for the corresponding anode to be removed, while the anode region 320(3) does not yet include the active anode material. Example materials for each of the current collector 308, anode-active material 312, and conductive coating 316 are mentioned both above and below.

At block 205, the anode-forming lamination method 200 includes providing a current-collector web 324. In one embodiment and as illustrated in FIG. 4, the current-collector web 324 may be provided as a ribbon 404 of current-collector material suitable for the R2R processing system 400 of FIG. 4. In other embodiments, the current-collector web 324 may be provided in another form, such as in sheet form whereby the current collector material is provided as individual sheets. The current-collector web 324 may be made of any suitable electrically conductive materials, such as a metal, for example, copper, nickel, titanium, or stainless steel, among others, or any suitable metal alloy. Fundamentally, there is no limitation on the type of material used for the current-collector web. The current-collector web 324 may have any of a variety of forms, such as solid foil, perforated foil, woven mesh, or expanded mesh, among others. Fundamentally, there is no limitation on the form of the current-collector web 324. Any mesh or other open structure may have a percentage of open area to total area in a range of about 5% to about 95%. Perforated mesh, if used, can be made by any of various processes, including, but not limited to, traditional perforating, rotary die-cutting, electroforming, photo-etching, and laser cutting, among others. In some embodiments, the current-collector web 324 has a width, Ww, in a range of about 20 mm to about 200 mm, in a range of about 120 mm to about 200 mm, in a range of about 150 mm to about 300 mm, or larger, especially when the thickness of the anode-active material Tam is about 50 µm or less and the active material is an alkali metal, such as lithium. The length of the current-collector web 324 may be any suitable length to accommodate implementing an anode-forming lamination method of the present disclosure, such as anode-forming lamination method 200 of FIG. 2 in a ribbon-based process or a sheet-based process.

The tabs 308B of the current collectors 308 of the anodes 300 may be formed from bare regions 304A of the current-collector web 324, i.e., regions of the current-collector web that do not have any anode-active material present, and, if the optional conductive coating 316 is used, also do not have any conductive coating material present. Consequently, this requires that the tab portions 320B(1) to 320B(3) of the anode regions 320 of the webbed anode precursor 304 be bare, as discussed below.

At optional block 210, an optional conductive-coating patch 328 is applied to one or each side of the current-collector web 324 depending, for example, on whether or not the finished anode 300 will have anode-active material on one or both sides of the current-collector web. In FIG. 3A, only a single conductive-coating patch 328 is shown, but in this example a similar conductive-coating patch is also on the opposite side of the current-collector web 324. If provided, the conductive coating is provided in conductive-coating patches 328 to provide inter-patch regions 304A that are bare portions of the current-collector web 324 wherein the tab portions 320B of the anode regions 320 are/will be located and from which the tabs 308B of the anode 300 are/will be formed. Each inter-patch region 304A can have a gap width, Wg, equal to or greater than the length, Lt, of the corresponding tab 308B on the respective anode 300. In some embodiments, the gap width Wg may be in a range of about 10 mm to about 30 mm based on the length Lt of the tabs 308B being of the same or similar dimension. In other embodiments, the gap width Wg of each inter-patch region 304A may be greater than about 30 mm or less than about 10 mm to suit a particular anode design.

When conductive-coating patches 328 are provided on both sides of the current-collector web 324, the conductive-coating patches for the same anode 300 are in registration with one another so that the conductive-coating patches and the inter-patch regions 304A are in the same locations as one another along the length of the current-collector web 324. In some embodiments, the width, Wccp, of each conductive-coating patch 328 is about equal to the width Wa of the active-material region 308A of the anode 300 to minimize waste. In some embodiments, the width Wccp of each conductive-coating patch 328 is greater than the width Wa of the active-material region 308A by about 1 mm to about 3 mm, or more, on each side of the active-material region 308A to ensure that when the anodes 300 are removed from the webbed anode precursor 304, conductive material is present at the cut edges of the anodes.

In some embodiments, the width, Wccp, of each conductive-coating patch 328 is about equal to the width Ww of the current-collector web 324, especially when the method 200 is used to create the anodes 300 from a single line of anode regions 320. In some embodiments, the width Wccp of each conductive-coating patch 328 is made to be less than about 95% of the width of the current-collector web 324 so as to leave enough of the current-collector web intact for easy handling of the waste material. For example, with enough of the current-collector web 324 remaining after removing the anodes 300 in an R2R system, such as R2R system 400 of FIG. 4, the waste material can be rolled onto a waste-collection roll (not shown). In some embodiments, the width Wccp of each conductive-coating patch 328 and/or width Waamp corresponding anode-active-material patch 336 is made to be less than 100% of the width Ww of the current-collector web 324, such as, for example, about 0.9 Ww<Wccp and/or Waamp<Ww, about 0.95 Ww<Wccp and/or Waamp<Ww, or about 0.98 Ww<Wccp and/or Waamp<Ww, among others. In some embodiments, the length, Lccp, of each current-collector patch 328 is made to be about equal to the length La of the active-material region 308A of the anode 300 to minimize waste. In some embodiments, the length Lccp of each conductive-coating patch 328 is greater than the length La of the active-material region 308A by about 1 mm to about 3 mm on each side of the active-material region 308A to ensure that when the anodes 300 are removed from the webbed anode precursor 304, having conductive material present at the cut edges of the anodes is ensured. Along the edge of the conductive-coating patch 328 where the tab 308B is, the conductive coating should typically be either flush with or extend at most about 1 mm beyond the anode-active-material patch 336. Typically, it is preferred that the conductive-coating patch 328 and the anode-active-material patch 336 not extend more than about 1.5 mm onto the tab 308B. Otherwise that "excess" material may interfere with the tab welding process.

Each conductive-coating patch 328 may act as a primer relative to the corresponding anode-active-material patch 336 to help improve adhesion therebetween while maintaining low contact resistance between the anode-active-material 312 and the current-collector 308 in the final anode 300. If provided, each conductive-coating patch 328 may be made of any suitable conductive material, such as a conductive-carbon material that includes one or more types of conductive-carbon particles and a suitable binder to bind the particles with one another and to the current-collector web 324. In other embodiments, conductive-carbon particles can be augmented with metal particles, while in still other embodiments, only metal particles may be used along with a suitable binder.

If a conductive-carbon material is used, it may be provided as a slurry prepared by blending conductive carbon and a binder material in an aqueous or organic solvent medium that is eventually dried after being applied to the current-collector web 324. Examples of conductive carbon material that can be used include carbon black, graphite, graphene, carbon fibers, carbon nano tubes, or a mixture thereof. Metals, such as silver, in a powder form can also be mixed in with the conductive carbon to enhance electrical conductivity. Examples of binder material include, but are not limited to PVDF (poly vinylidene fluoride), PVDF-HFP (poly vinylidene fluoride-hexafluoropropylene), CMC (carboxymethyl cellulose) and SBR (styrene-butadiene rubber), and a mixture thereof.

As noted above, the binder in the conductive-coating patches 328 can help the anode-active-material patches 336 adhere well to the current-collector web 324 and prevents delamination of anode-active material from the current-collector web and current collector 308 during handling and use. The conductive material(s) in the conductive-coating helps to maintain a low contact resistance between the anode-active material 312 and the current collector 308 in the finished anode 300, which together with better adhesion helps to improve cell-cycle performance in secondary batteries made using anodes incorporating such conductive material(s).

The thickness of each conductive-coating patch 328 may be, for example, in a range of about 0.1 um to about 5 um, in a range of about 0.5 µm to about 2 and about 1 among other ranges and values. In some embodiments, if the surface roughness (Ra, arithmetic mean roughness) of the anode-active material is X µm, then the thickness of the coating may be in a range of about 0.2X µm to about 2X µm. Current evidence demonstrates that in some embodiments (including embodiments in which lithium foil is used for the anode-active-material patches 336, a thickness of about 1 µm for each conductive-coating patch 328 can be optimal based on the following considerations. The conductive-coating patches 328 need to be substantial enough to improve adhesion and conductivity. However, thicker coatings can generate side reactions and add unnecessary weight and volume to a cell. In addition, it may be that there is a minimum thickness that accommodates variation in average surface roughness of the anode-active material (e.g., lithium). The relationship may be directly or inversely proportional depending on a number of factors. For example, in the context of lithium, lithium metal easily deforms, and a lithium foil with higher roughness might easily latch on to, for example, a copper surface, and a thin conductive-coating may be all that is needed. However, this relationship may be further complicated by any passivation layer present on the surface of the lithium foil, as a pristine lithium surface may bond well to the copper surface, but most lithium foils have surface passivation layer with differing chemistry and thickness values depending on a given vendor's specific production process. Consequently, there may be variability on the optimal thickness depending on the particular facts involved.

In some embodiments, the areal loading of the conductive-coating material in each conductive-coating patch 328 may be in a range of about 0.1 $g/m^2$ to about 2 $g/m^2$ and in some embodiments about 0.5 $g/m^2$. In some embodiments, the surface resistance of each conductive-coating patch 328 may be below about 30 ohms/sq for a coating thickness of about 1 and the surface resistivity may be below about $3 \times 10^{-3}$ ohm-cm. Generally, the units of surface resistance is ohms/sq, and the surface resistance depends on the thickness of the each conductive-coating patch 328, with the thicker the conductive-coating patch, the lower the resistance. Therefore, for thicknesses other than about 1 the surface resistance will be different from 30 ohms/sq. In some embodiments, the amount of conductive material (e.g., conductive carbon, conductive metal, or combination thereof) in the conductive-coating material may be in a range of about 5 wt. % to about 95 wt. % or in a range of about 70 wt. % to about 90 wt. %.

As an example of a benefit of using the conductive-coating patches 328, in the context of the anode-active material being lithium and the current-collector web 324 being copper, fresh lithium typically adheres well to copper surface. However, the passivation layer that is typically present on the surface of conventional lithium foils inhibits its adhesion to copper. The composition of the passivation layer depends on the atmosphere to which the lithium foil was exposed to initially during manufacture and is typically made of salts such as lithium carbonate, lithium hydroxide, lithium oxide, and lithium nitride. In addition, the surface of lithium foil may also have residual lubricants from the roll-milling process used to form the lithium foil. The presence of a passivation layer and/or oil residue on the surface, hinders lithium foil from adhering well to copper during lamination. Providing the conductive-coating patches 328 helps overcome this issue by providing a layer that adheres well to the current-collector web 324 and to which the anode-active-material patches 336 adheres well.

For example, a peel test was applied to samples of lithium foil (anode-active material) pressure-laminated to a copper foil (current collector)—one with the lithium foil applied directly to the copper foil and one with a conductive-carbon coating present between the lithium foil and the copper foil. A piece of SCOTCH® tape (available from 3M Corporation, St. Paul, Minn.) was gently pressed onto the lithium foil of each sample and then peeled slowly. Despite the lamination conditions being the same as between the two samples, except for the presence of the conductive coating in one of the samples, the lithium foil that was laminated directly to the copper foil peeled off of the copper foil along with the tape, whereas the lithium foil laminated to the conductive-carbon coating did not peel off with the tape and remained laminated to the conductive-carbon coating and the copper foil beneath the conductive-carbon coating. It is noted that a pressure-sensitive tape other than SCOTCH® tape can be used. If the lithium foil is adhered well to the copper foil, then the peel force would typically be greater than about 200 N/m.

To apply the optional conductive-coating patches 328 to the current-collector web 324, example R2R system 400 may include coating-application equipment 408 suitable for the type of conductive-coating material at issue. For example, coating-application equipment 408 may include one or more coating applicators 408A(1) and 408A(2) that may be knife-type applicators, spray applicators, or roller applicators, among others. Example coating processes that can be used include slot-die casting, tape casting, gravure, comma, spray coating, and dip coating, among others. Fundamentally, there are no limitations on the manner in which the conductive-coating patches 328 may be applied. Coating-application equipment 408 may also include one or more patterning devices 408B(1) and 408B(2), such as an open mask or silk screen, among others, for ensuring that the conductive-coating patches are of the desired size. Those skilled in the art will readily understand how to apply the optional conductive-coating patches 328 to the current-collector web 324 at the proper locations on the webbed anode precursor 304 and the appropriate coating-application equipment 408 needed for such application, such that detailed descriptions of each are not necessary for those skilled in the art to practice the present inventions to their fullest scope without undue experimentation.

At block 215, a metal foil 332 is laminated on one or each side of the current-collector web 324 as a corresponding anode-active-material patch 336 (only one shown, but in this example another anode-active-material patch is present on the opposite side of the current-collector web). The lamination of the metal foil 332 may first include engaging the metal foil 332 with the current-collector web 324, with or without the conductive-coating patches 328 depending on whether or not they are used in a particular application. The engaging of the metal foil 332 can be performed in any suitable manner, such as, for example, via transfer from a temporary holding substrate or via a pick and place system, among others. In some embodiments, the metal foil 332 may be pressed into firm engagement with the current-collector web 324 or, if present, to each corresponding conductive-coating patch 328. Such pressing may be performed in any suitable manner, such as, for example, using a roller press or stationary press, among others. In some embodiments, lamination of the metal foil 332 may be performed using a roll-mill or calendaring machine, wherein the lamination pressure is determined by the gap setting between the rolls. In some embodiments, the pressure applied by the rollers should not deform the metal foil 332 significantly, i.e., there should be a negligible reduction in thickness or increase in width and/or length of lithium foil. For example, when a conductive-coating patch 328 is present, it is typically desirable that the metal foil 332 in the corresponding anode-active-material patch 336 remain about within the footprint of the underlying conductive-coating patch. In some embodiments, it is desirable that the reduction in thickness of the metal foil 332 be less than about 10% of the original thickness of the metal foil and that the increase in length and/or width of the metal foil be less than about 2%. Fundamentally, there is no limitation on the manner by which the metal foil 332 can be pressed onto the webbed anode precursor 304.

The metal foil 332 may have a thickness in a range of about 15 μm to about 25 μm in some embodiments, of about 20 μm in some embodiments, in a range of about 10 μm to about 50 μm in some embodiments, and in a range of about 1 μm to about 100 μm in some embodiments, among other ranges and values. These thicknesses are particularly applicable to lithium-containing, including pure lithium, alkali-metal-based foils generally, and foils based on one or more other metals. Current evidence demonstrates that a thickness of about 20 μm for the metal foil 332, including lithium-metal foil, while adding to the thickness of an electrochemical cell made using anodes 300, can be an optimal tradeoff of a variety of factors, including cycle life, handleability, cost, weight, and plating, among other things. In some embodiments, the thickness of the current-collector web 324 may be in a range of about 4 μm to 10 μm and in some embodiments about 6 μm, including the case wherein the current-collector web is a copper foil, among other ranges and values. Current evidence demonstrates that 6 μm for the current-collector thickness can be an optimal tradeoff of, for example, weight, strength, energy density, complexity of lamination, cost, and thickness, among other things.

In some embodiments, the metal foil 332 may be pre-sized to be about equal to the size of the active region portions 320A(1) to 320A(3) of the anode regions 320(1) to 320(3) or to the size of the corresponding conductive-coating patch 328, or both. Such sizing could be used, for example, in a transfer process from a temporary substrate or in a pick-and-place process, such as a pick-and-place process using a suitably gentle vacuum. In some embodiments, the metal foil 332 may be provided in a continuous sheet or ribbon. For example, if the conductive-coating patches 328 are used and they provide significant adhesion for the metal foil relative to the bare portions current-collector web 324, then the anode-active-material patches 336 may be formed by pressing the continuous sheet or ribbon to the current-collector web and removing the portions of the metal foil 332 from the previously bare portions of the current-collector web where the metal foil does not adhere well. In some embodiments, the width, Waamp, of each anode-active-material patch 336 is about equal to the width Wa of the active-material region 308A of the anode 300 to minimize waste. In some embodiments, the width Waamp, of each anode-active-material patch 336 is greater than the width Wa of the active-material region 308A by about 1 mm to about 3 mm on each side of the active-material region 308A to ensure that when the anodes 300 are removed from the webbed anode precursor 304, conductive material is present at the cut edges of the anodes.

In some embodiments, if conductive-coating patches 328 are used and if the conductive coating material used provides the conductive-coating patches with suitable characteristics, then the method 200 may include, at an optional sub-block 215A, using the conductive-coating patches to align sheets of the metal foil 332 with the conductive-coating patches. For example, if the conductive-coating patch 328 provides a machine-detectable contrast, such as an optical contrast, between the conductive-coating patches and the underlying current-collector web 324, then a suitable detection system can be provided to sense the contrast and provide location information to a control system that controls the registration of the sheets of the metal foil 332 with the conductive-coating patches. An example of a detection system is a machine-vision system that can detect and locate one or more edges of each conductive-coating patch 328.

Referring to FIG. 4 and the example R2R system 400, the R2R system may include a lamination region 412 where the metal foil 332 (only some labeled in FIG. 4) is engaged with and laminated to the current-collector web 324. As noted above, the lamination region 412 may take any of a wide variety of forms, depending on, for example, the manner in which the metal foil 332 is delivered to the current-collector web 324, whether or not conductive-coating patches 328 are used, and the manner in which the metal foil is pressed onto the current-collector web. In the embodiment illustrated in FIG. 4, the metal foil 332 is delivered as individual foil sheets 416 (only some labeled in FIG. 4) on a pair of temporary support ribbons 420(1) and 420(2)—one for each side of the current-collector-web ribbon 404—that relatively loosely holds the foil sheets before they are laminated to the current-collector-web ribbon. The embodiment shown also includes a roller press 424 that presses the foil sheets 416 into firm engagement with the current-collector-web ribbon 404 to form the anode-active-material patches 336.

In this embodiment, the foil sheets 416 are delivered to the current-collector-web ribbon 404 using a pair of transfer rollers 428(1) and 428(2) that may, for example, apply a relatively small amount of pressure to effect the transfer of the foil sheets to the current-collector-web ribbon. Due to a greater adhesion between the foil sheets 416 with the current-collector-web ribbon 404, especially when the conductive-coating patches 328 are present, than between the foil sheets and the temporary support ribbon 420(1) and 420(2), the temporary support ribbons can be easily peeled away from the anode-active-material patches 336 now part of the webbed anode precursor 304. In some embodiments, the spacing between the foil sheets 416 on the temporary support ribbons 420(1) and 420(2) precisely matches the inter-patch regions 304A. In other embodiments, the spacing between the foil sheets 416 on the temporary support ribbons 420(1) and 420(2) may not match the inter-patch regions 304A. In some embodiments when the spacing between the foil sheets 416 on the temporary support ribbons 420(1) and 420(2) precisely matches the inter-patch regions 304A, all of the temporary support ribbons 420(1) and 420(2) and the current-collector-web ribbon 404 may be run through the roller press 424. In that case, the transfer rollers 428(1) and 428(2) may be eliminated.

Still referring to FIG. 4, if the conductive-coating patches 328 are used, example R2R system 400 may optionally include an alignment system 432 that utilizes the conductive-coating patches to precisely align the foil sheets 416 with corresponding respective ones of the conductive-coating patches. This alignment puts each foil sheet 416 into proper precise registration with a corresponding one of the conductive coating patches 328 prior to that anode-active-material sheet being firmly laminated by the roller press 424 to create the corresponding anode-active-material patch 336. When the conductive-coating patches 328 comprise a visually high-contrast material, such as a conductive-carbon coating, relative to the bare material of the current-collector web 324, the alignment system 432 may include one or more optical sensors, here two optical sensors 432A(1) and 432A(2), for detecting and locating at least one edge of each conductive-coating patch. The alignment system 432 may also include one or more controllers 432B (only one shown) and one or more actuators, such as stepper motors (not shown), that the controller controls to precisely advance each of the temporary support ribbons 420(1) and 420(2). The controller 432B may be programmed to use location information for the one or more edges from the optical sensors 432A(1) and 432A(2) and position information for the temporary support ribbons 420(1) and 420(2) to precisely control the registrations of the foil sheets 416 with the corresponding ones of the conductive-coating patches 324. Those skilled in the art will understand how to implement various types of alignment systems that can use the conductive-coating patches 328 to assist in the alignment of the foil sheets 416 with the conductive-coating patches 328 without undue experimentation.

Example method 200 further includes a block 220 at which the anodes 300 are formed from the webbed anode precursor 304. The anodes may be formed from the webbed anode precursor 304 in any suitable manner, such as by punching, sheering, or otherwise cutting the webbed anode precursor 304 at the anode regions, for example, the anode regions 320(1) to 320(3) to define and liberate the resulting anodes 300 therefrom. In this connection, FIG. 4 illustrates example R2R system 400 as including anode-forming equipment 436, which may include any suitable automated punching, sheering, or other cutting tool(s), that may be configured to form one or more of the anodes 300 at a time. Those skilled in the art will readily understand how to implement the suitable anode-forming equipment 436 without the need for any undue experimentation. The formed anodes 300 may now be ready for use in the next step of making one or more electrochemical devices (not shown) using the anodes 300 so formed.

FIGS. 5A to 5E illustrate some example alternative arrangements of anode regions and anode-active-material patches (and underlying conductive-coating patches, if any) on various webbed anode precursors that can be used in place of the arrangements of anode regions 320 and anode-active-material patches 336 (and if present, conductive-coating patches 328) on webbed anode precursor 304 of FIG. 3A. It is noted that alternatives to the arrangements illustrated relative to webbed anode precursor 304 of FIG. 3A are not limited to the alternative arrangements of FIGS. 5A to 5E; rather these are example arrangements provided to illustrate the flexibility of methods of forming anodes in accordance with the present disclosure. In describing FIGS.

5A to 5E below, no references are made to conductive-coating patches to simplify the explanation. However, as just noted, conductive-coating patches may indeed be present beneath the corresponding anode-active-material patches, for example, in a manner discussed above in connection with FIGS. 2 to 4. It is also noted that the alternative arrangements of FIGS. 5A to 5E are described as if the anode-active-material patches are located on only the obverse side of the webbed anode precursors as seen in the figures. While this may be so, the reverse side of the webbed anode precursors may likewise have matching anode-active-material patches (and optionally conductive-coating patches) in registration with the anode-active-material patches on the obverse side of the webbed anode precursors. It is further noted, that in all regards other than the differing arrangements of the anode regions and anode-active-material patches, such as materials, thicknesses, areal dimensions, and processes of creation, among others, the anode regions in FIGS. 5A to 5E may be the same as or similar to anode regions described elsewhere in this disclosure, such as relative to anode regions 320(1) to 320(3) of FIG. 3A.

Figure 5A:
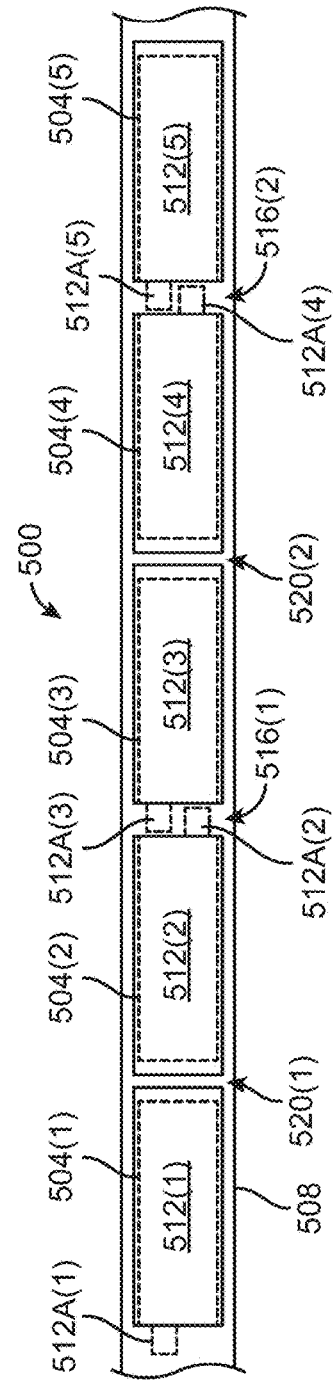

FIG. 5A illustrates an example webbed anode precursor 500 in which the anode-active-material patches 504(1) to 504(5) (solid lines) are provided in a single line on the underlying current-collector web 508. In this example, each anode-active-material patch 504(1) to 504(5) is provided for forming a single anode region 512(1) to 512(5) (dashed lines) that will eventually be removed from the webbed anode precursor 500 to form a corresponding anode (not shown, but similar to anode 300 of FIGS. 3A and 3B).

As can be seen by comparing FIG. 5A to FIG. 3A, a difference between webbed anode precursor 500 of FIG. 5A and webbed anode precursor 304 of FIG. 3A is that the tab portions 512A, here 512A(2) to 512A(5), of immediately adjacent pairs of the anode regions 512(2) to 512(5) are located in the same inter-patch regions 516, here 516(1) and 516(2). This arrangement can provide less waste of the current collector web 508, as the inter-patch regions 520, here 520(1) and 520(2), can be made smaller than the inter-patch regions 516 that contain the pairs of tab portions 512A(2) to 512A(5).

FIG. 5B is generally similar to FIG. 5A, except that the feature of minimizing the size of the inter-patch regions 520 (FIG. 5A) is taken to the extreme in FIG. 5B by eliminating those inter-patch regions altogether. In this manner, each pair of anode-active-material patches 504(1) to 504(4) on opposite sides of the interpatch regions 520 (FIG. 5A) are, in FIG. 5B, effectively joined together into a single anode-active-material patch 524, here 524(1) and 524(2) that, in this example, is about twice the size of each of the anode-active-material patches 504(1) to 504(5) of FIG. 5A. With this configuration, each anode-active-material patch 524 of FIG. 5B is provided for forming two anode regions 528, here the anode regions 528(1) and 528(2) at the anode-active-material patch 524(1) and the anode regions 528(3) and 528(4) at the anode-active-material patch 524(2). Depending on the processing limitations of the anode-active material used relative to the size of the anode regions needed, the configuration of FIG. 5B may not be achievable. For example, if the anode-active material is lithium, processing limitations may limit the length of the anode-active-material patches, such as the anode-active-material patches 504 and 524 of FIGS. 5A and 5B, respectively, that can be made. In such cases, it may be necessary to use a different configuration wherein there is a 1:1 correspondence between the anode-active-material patches and the number of anode regions made from those anode-active-patches, such as either of the configurations shown in FIGS. 3A and 5A, among others.

Figure 5E:
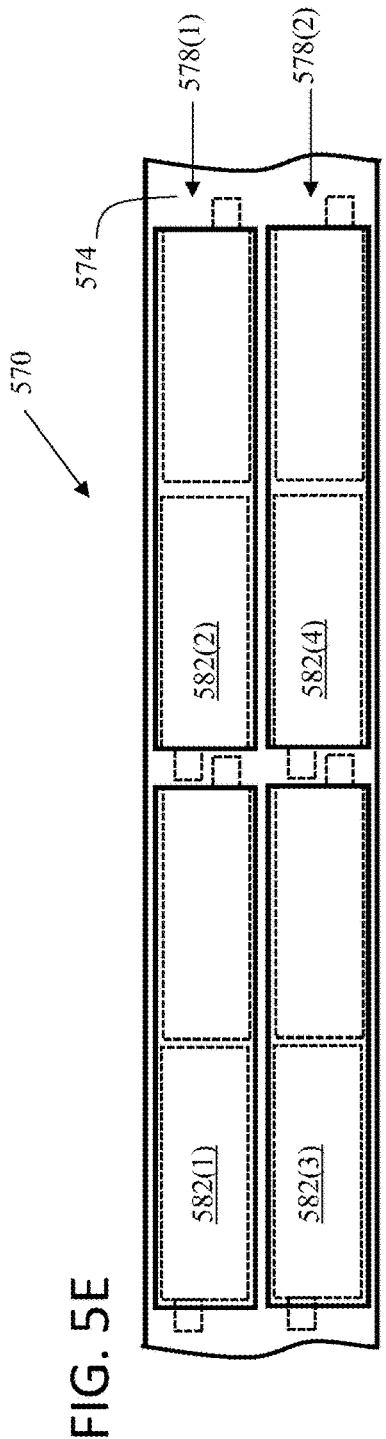

FIGS. 5C to 5E, respectively, illustrate multiline variants 530, 550, and 570 of the example configurations shown in FIGS. 3A, 5A, and 5B. In reviewing the multiline variants 530, 550, and 570 of FIGS. 5C to 5E, the reader can reference FIGS. 3A, 5A, and 5B and the corresponding description for information on the corresponding single-line configuration, as each of these multiline variant can be made by starting with a larger (e.g., wider) current-collector web, here 534, 554, and 574, respectively, and repeating the corresponding single-line configuration multiple times on such larger current-collector web. It is noted that while each of the variants 530, 550, and 570 of FIGS. 5C to 5E shows two lines 538(1) and 538(2), 558(1) and 558(2), and 578(1) and 578(2) of anode-active-material patches 542 (here, 542(1) to 542(6)), 562 (here, 562(1) to 562(10)), and 582 (here, 582(1) and 582(4)), in other embodiments, a greater number of lines can be provided. Generally, the only limitations on the number of lines 538, 558, and 578 implemented are the availability of sufficiently large current-collector webs 534, 554, and 574 and the ability to make the corresponding fabrication equipment. It is also noted that, like other embodiments disclosed herein, each of the current-collector webs 534, 554, and 574 may be, for example, of a sheet type or a ribbon type depending on the type of processing equipment used. For example, ribbon-type current-collector webs are readily amenable to R2R processing, such as in an R2R system similar to the R2R system 400 of FIG. 4.

It is noted that all of the embodiments shown in FIGS. 3A through 5E show all of the anode regions, and correspondingly the anode-active-material patches, any conductive-coating patches, if any, and anodes formed therefrom, as being uniform in size in each figure. However, while this would be typical for a production run for electrochemical cells of a common size, this need not be so. For example, some embodiments of anode-forming methods of the present disclosure may be adjusted to make anodes of differing sizes on the same webbed anode precursor.

Figure 6:
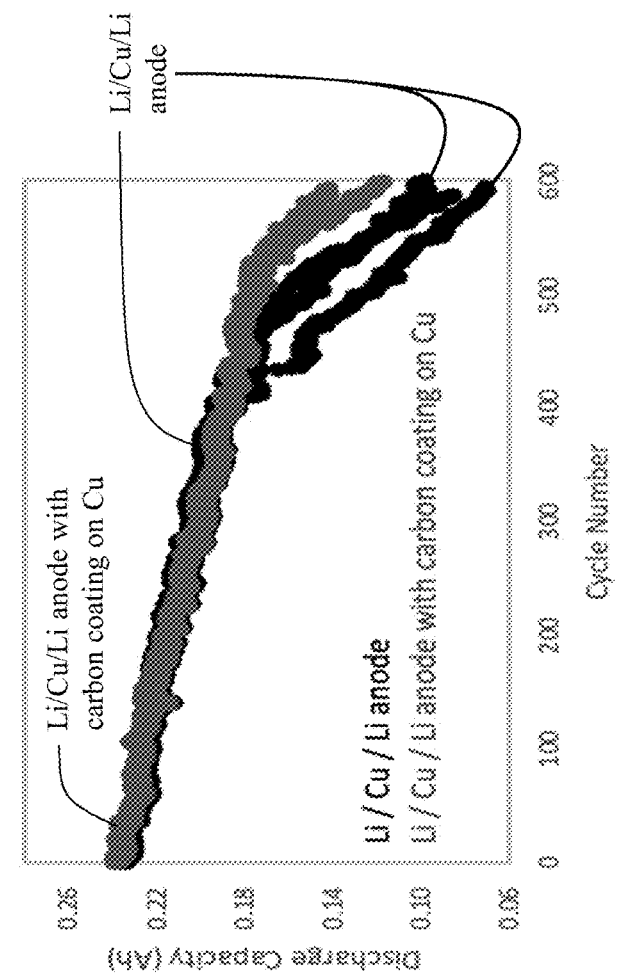
FIG. 6 is a graph of discharge capacity versus cycle life comparing cycle life performance of example Li/Cu/Li anodes made with and without a conductive-coating layer of the present disclosure.

FIG. 6 is a graph of discharge capacity versus cycle number comparing the cell cycle life performance of lithium-copper (Li/Cu) anodes (20-µm-thick Li, double-side on Cu, 8-µm-thick Cu, 1-µm-thick coating made of between about 70% to about 90% carbon black and PVDF) with and without using a conductive coating of the present disclosure. To generate the data for this graph, cycle-life test was performed in multi-layer pouch cells built with nickel-manganese-cobalt (NMC) oxide-based cathodes and microporous polyolefin-based separators. The pores in the cathode and separator are filled with a $Li^+$ conducting liquid electrolyte. The electrolyte typically contains a lithium salt such as $LiPF_6$ or LiFSI dissolved in a carbonate or ether-based solvent. The cells were cycled between 2.5V to 4.3V at a C/5-1C charge-discharge rate.

As shown in FIG. 6, including a conductive coating of the present disclosure on the copper current collector has been found to enhance the cycle-life performance of cells with lithium anode. As the cycle number increases, the dense lithium gradually became a more porous structure, and the conductive coating helped to maintain a good electrical contact between the porous lithium and the copper current collector substrate. This further lead to more uniform current density distribution and uniform lithium plating/stripping and, consequently, to an enhanced cycle life performance. Although the initial area specific impedance (ASI) of cells made with conducive coatings on the copper current collector was higher compared to cells containing the uncoated copper current collector (~38 ohm-cm² for coated vs ~28 ohm-cm² for uncoated), as the cell cycle number increased the difference gradually decreased, and after 500 cycles, the relative ASI of cells made with the conductive coating were found to be lower compared to the cells containing the uncoated copper current collector (~85 ohm-cm² for coated vs ~92 ohm-cm² for uncoated).

It is noted that when an electrically conductive coating of the present disclosure, such as the optional conductive coating 316 of example anode 300 of FIG. 3A, is present in an anode, the anode need not be made using a lamination method of the present disclosure. For example, the anode-active material, which is equivalent to the anode-active material 312 of anode 300, may be applied using another method, such as vapor deposition, among other potential techniques that are or may be under development.

Figure 7:
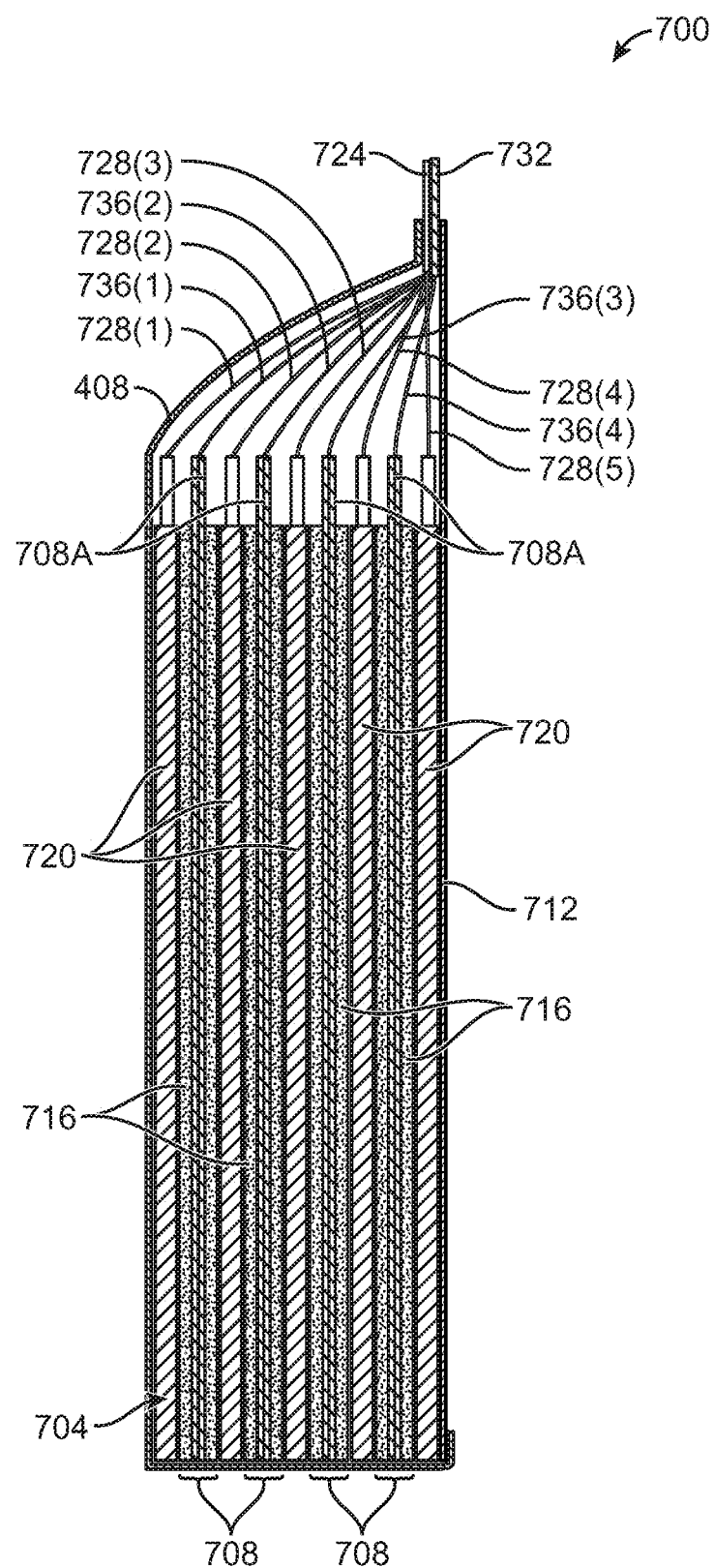
FIG. 7 is a high-level cross-sectional view of an electrochemical cell made using a plurality of anodes made in accordance with the present disclosure.

FIG. 7 illustrates an example secondary battery 700 made in accordance with the present disclosure. In particular, the example battery 700 includes a stacked jellyroll 704 that includes a plurality of anodes 708 that either include an electrically conductive coating (not shown) of the present disclosure, such as the conductive coating 316 of FIG. 3A, or are made using a lamination method of the present disclosure, such as the lamination method 200 of FIG. 2, or both. Novelty of the example secondary battery 700 can arise from the novelty of the anodes 708 themselves in terms of presence of a unique conductive-coating layer (not shown, but see, e.g., conductive coating 316 of FIGS. 3A and 3B) contained within them and/or by their areal size being larger than the areal size of conventionally made laminated anodes, along with the improved cycle-life performance and/or higher gravimetric and volumetric energy densities that result therefrom, as compared to conventionally configured and manufactured anodes. The stacked jellyroll 704 also includes a plurality of separator layers 716 and a plurality of cathodes 720 electrically separated from the anodes 708 by the separator layers.

In this example, the stacked jellyroll 704 is sealed within a casing, here, a pouch-type casing 712, along with a suitable electrolyte (not illustrated, but present in at least the separator layers 716 (not all labeled), which may be considered part of a polymer electrolyte if a solid- or gel-type electrolyte is used). In other embodiments, the pouch-type casing 712 may be replaced with a casing of a differing type, such as a rigid-wall housing, among others. Fundamentally, the type of casing is important only to the extent that it provides the requisite functionalities, including providing a sealed volume for containing the stacked jellyroll 704 and the electrolyte. Those skilled in the art are familiar with techniques and materials for constructing the pouch-type casing 712 or other type of casing that a particular design may include. Consequently, further details on the casing 712 are not necessary herein for those skilled in the art to instantiate the secondary battery 700 without undue experimentation.

As discussed above, each anode 708 may include any suitable anode-active metal, such as lithium, sodium, potassium, magnesium, or aluminum, or any suitable combination thereof, just as with example anode 300 discussed above. Depending on the type of battery, for example, lithium-metal, sodium-metal, lithium-air, lithium-sulfur, etc., each cathode includes a suitable cathode-active material. In one or more embodiments, the cathode has a general formula of $Li_xM_yO_z$, where M is a transition metal such as Co, Mn, Ni, V, Fe, or Cr.

In one or more embodiments, each cathode 720 may comprise a layered or spinel oxide material selected from the group comprising of $LiCoO_2$, $Li(Ni_{1/3}Mn_{1/3}Co_{1/3})O_2$, $Li(Ni_{0.8}Co_{0.15}Al_{0.05})O_2$, $LiMn_2O_4$, $Li(Mn_{1.5}Ni_{0.5})_2O_4$, or their lithium rich versions. In one or more embodiments, each cathode 720 may have a general formula of $Li_xM_yPO_z$, wherein M is a transition metal such as Co, Mn, Ni, V, Fe, or Cr. In one or more embodiments, each cathode 720 may be a phosphate material selected from the group comprising of $LiFePO_4$, $LiNiPO_4$, $LiCoPO_4$, or $LiMnPO_4$. In one or more embodiments, each cathode 720 may comprise a porous coating comprising a cathode-active material powder, a polymeric binder, such as PVDF, and a conductive diluent such as carbon black. In one or more embodiments, each cathode 720 may comprise a porous coating on aluminum foil. In one or more embodiments, each cathode 720 may include lithium cobalt oxide (or lithium cobaltate), lithium manganese oxide (also known as spinel or lithium manganate), lithium iron phosphate, as well as lithium nickel manganese cobalt (or NMC) and/or lithium nickel cobalt aluminum oxide (or NCA). In one or more embodiments, each cathode 720 may comprise a nanosized and nanostructured sulfur-based composite, such as a sulfur-impregnated core-shell hierarchical porous carbon (HPC) composite, a sulfur/graphene nanosheet (GNS) composite, a sulfur@rGO (reduced graphene oxide) composite with a saccule-like structure, and a C-S@PANi (polyaniline) composite with polymer spherical network structured, among others. In one or more embodiments, each cathode 720 may comprise carbon layers sandwiched around a current collector and then covered with a polymer film, such as a PTFE film. The carbon layers may contain a metal catalyst that enhance the oxygen reduction kinetics and increase the specific capacity of the cathode 720. Example metal catalysts include, but are not limited to, manganese, cobalt, ruthenium, platinum, silver, and mixtures thereof.

In one or more embodiments, when the electrolyte is a liquid, each separator layer 716 may be made of any one or more materials, at least one of which is a dielectric. For example, in one or more embodiments, each separator layer 716 may be made of polypropylene or polyethylene or any suitable combination (e.g., mixture, layers, coating, etc.) thereof. Those skilled in the art will understand the variety of materials and constructions that can be used to make each separator layer 716.

Regarding the electrolyte, in one example the secondary battery 700 is a lithium-metal battery, meaning that the anodes 708 comprise lithium metal to/from which lithium ions are deposited and stripped during, respectively, charging and discharging cycles. Correspondingly, the electrolyte contains lithium ions (not shown) that flow between the anodes and cathodes 720 within the stacked jellyroll 704 during the charging and discharging cycles. Consequently, in this example the electrolyte includes one or more lithium-based salts in a suitable form, such as in a solution, a eutectic mixture, or a molten form, among others. In some embodiments, the electrolyte may contain one or more solvents, one or more performance and/or property enhancing additives, and/or one or more polymers, among other things. The electrolyte may be in any suitable state of matter, such as liquid, gel, or solid state. The composition of the electrolyte, whether it is for a lithium-metal-based version of the secondary battery 700 or a version based on another type of metal (e.g., sodium, potassium, aluminum, magnesium, among others), can be any composition suitable for the particular application at issue and can be determined by the designer of the particular instantiations of the secondary battery.

Example salts that can be used in the electrolyte include, but are not limited to, LiFSI, LiTFSI, and lithium fluorosulfonyl(trifluoromethylsulfonyl)imide (LiFTF SI), $LiPF_6$, $LiAsF_6$, $LiBF_4$, LiBOB, and Li-triflate, and any combination thereof, among others. In one or more embodiments, two or more salts can be combined in a eutectic mixture, such as a eutectic mixture that includes a first salt, $X_1^+Y_1^-$, and a second salt, $X_2^+Y_2^-$, wherein each of $X1^+$ and $X_2^+$ is an alkali metal cation and $X1^+$ is different from $X_2^+$, and each of $Y_1^-$ and $Y_2^+$ is a sulfonimide anion and $Y_1^-$ is different from $Y_2^-$. In one or more embodiments, $Y_1^-$ and $Y_2^-$ may be selected from the group consisting of $FSO_2N^-SO_2F$ (FSI$^-$) and $FSO_2N^-SO_2CF_3$ (FTFSI$^-$) and/or $X_1^+$ and $X_2^+$ may be selected from the group consisting of $Li^+$, $Na^+$, $K^+$, $Rb^+$, and $Cs^+$. In one or more embodiments, the eutectic mixture may further include a third salt, $X_3^+Y_3^-$, wherein $X_3^+$ is different from each of $X_1^+$ and $X_2^+$. In one or more embodiments, $Y_1^-$, $Y_2^-$, and $Y_3^-$ may be selected from the group consisting of $FSO_2N^-SO_2F$ (FSI$^-$) and $FSO_2N^-SO_2CF_3$ (FTFSI$^-$) and/or $X_1^+$, $X_2^+$, and $X_3^+$ may be selected from the group consisting of $Li^+$, $Na^+$, $K^+$, $Rb^+$, and $Cs^+$.

In one or more embodiments, the electrolyte may include an imide salt, for example, lithium bisfluorosulfonylimide ($LiN(FSO_2)_2$, and a perchlorate salt in an aprotic solvent. Other lithium imide salts with a fluorosulfonyl ($FSO_2$) group, e.g., $LiN(FSO_2)_2$, $LiN(FSO_2)(CF_3SO_2)$, $LiN(FSO_2)(C_2F_5SO_2)$, can be used instead of or in any combination with lithium bisfluorosulfonylimide ($LiN(FSO_2)_2$. In one or more embodiments, the perchlorate salt may include $LiClO_4$. In one or more embodiments, the perchlorate salt has a concentration between 0.05M moles/liter to 0.50M moles/liter of the organic solvent. In one or more embodiments, the perchlorate salt is selected from the group consisting of $LiClO_4$, $Ca(ClO_4)_2$, $Sr(ClO_4)_2$, $Mg(ClO_4)_2$, $Ba(ClO_4)_2$, and any combination or mixture thereof.

In one or more embodiments, the electrolyte may comprise a glyme of the formula $R_1$—(O—$CH_2$—$CH_2$)$_n$—O—$R_2$, wherein n=1 to 4 and at least one of $R_1$ and $R_2$ is a hydrocarbon sidechain having at least 2 carbon atoms. In one or more embodiments, such electrolyte may further include a diluent selected from the group consisting of a fluorinated glyme and a fluorinated ether. The fluorinated diluent can allow the use of more-stable longer-sidechain glyme-based solvents (such as DEE (1,2-diethoxyethane or ethylene glycol diethyl ether), DPE (1,2-dipropoxyethane or ethylene glycol dipropyl ether), DBE (1,2-dibutoxyethane or ethylene glycol dibutyl ether), diethylene glycol diethyl ether, diethylene glycol dipropyl ether, diethylene glycol dibutyl ether, triethylene glycol diethyl ether, triethylene glycol dipropyl ether, triethylene glycol dibutyl ether, tetraethylene glycol diethyl ether, tetraethylene glycol dipropyl ether, tetraethylene glycol dibutyl, etc. In one or more embodiments, the diluent may be the fluorinated ether 1,1,2,2-tetrafluoroethyl-2,2,3,3-tetrafluoropropyl ether (TTE), or the fluorinated ether bis(2,2,2-trifluoroethyl) ether (BTFE). In one or more embodiments, the diluent of may include suitable hydrocarbon molecules having at least one oxygen (—O—) linkage and at least one fluorine (—F) substitution. In a specific example, DEE and TFE are combined with one another. In one or more embodiments, the solvent:diluent ratio of an electrolyte made in accordance with this paragraph may by in a range of about 10:90 to 100:0. In one or more embodiments, the solvent:diluent ratio may be desired to be in a range of about 40:60 to about 90:10, and in one or more embodiments the solvent:diluent ratio may be desired to be in a range of about 60:40 to about 80:20.

In one or more embodiments, the electrolyte may be a free-solvent-free liquid lithium sulfonimide salt composition consisting essentially of an adduct of molecules of a lithium sulfonimide salt and molecules of at least one anhydrous ether-based solvent. In such embodiment(s), examples of lithium sulfonimide salt compositions that can be used for the anhydrous lithium sulfonimide salt include, but are not necessarily limited to, LiFSI, LiTFSI, and (LiFTFSI), and examples of anhydrous ether-based solvents that can be used for the one or more anhydrous ether-based solvents include, but are not necessarily limited to, dimethoxyethane, ethoxymethoxyethane, diethoxyethane, dimethoxymethane, diethoxymethane, ethoxymethoxyethane, dioxane, and crown ethers, among others. Generally, any ether-based solvent can be used. In such embodiment(s), substantially all molecules of the at least one ether-based solvent are coordinated with molecules of the at least one lithium sulfonimide salt. In one or more embodiments, the at least one ether-based solvent is present in the free-solvent-free lithium sulfonimide salt composition in an amount less than 5% by weight of the free-solvent-free lithium sulfonimide salt composition.

In one or more embodiments, the electrolyte contains a cyclic carbonate, such as ethylene carbonate or propylene carbonate, and their derivatives, as an organic solvent. In one or more embodiments, the electrolyte contains a linear carbonate, such as dimethyl carbonate, diethyl carbonate or ethyl methyl carbonate. In one or more embodiments, the electrolyte contains a cyclic ether, such as tetrahydrofuran or tetrahydropyran, and their derivatives, as an organic solvent. In one or more embodiments, the electrolyte contains a glyme, such as dimethoxyethane, diethoxyethane, triglyme, or tetraglyme, and their derivatives, as an organic solvent. In one or more embodiments, the electrolyte contains an ether such as diethylether, or methybutylether and their derivatives, as an organic solvent. In one or more embodiments, the electrolyte contains a sulfonyl solvent such as N,N-dialkyl sulfamoyl fluoride and their derivatives and combinations thereof, as an organic solvent. In one or more embodiments, the electrolyte contain a mixture of organic solvents of the same type or a mixture of organic solvents of two or more types.

In one or more embodiments, the electrolyte may comprise one or more inorganic electrolytes selected from the group consisting of lithium silicates, lithium borates, lithium aluminates, lithium phosphates, lithium oxynitrides, lithium oxyborides, lithium silicosulfides, lithium borosulfides, lithium aluminosulfides, lithium phosphosulfides, and any combination thereof. In one or more embodiments, the electrolyte may comprise one or more solid ceramic electrolytes such as the Al-doped LLZO ($Li_{6.25}Al_{0.25}La_3Zr_2O_{12}$) garnet oxide, perovskite ($Li_{0.29}La_{0.57}TiO_3$), LISICON ($Li_{14}ZnGe_4O_{16}$), NASICION ($Li_{1.3}Al_{0.3}Ti_{1.7}(PO_4)_3$), thio-LISICON ($Li_{10}GeP_2S_{12}$), or other glass (LiPON) or glass-ceramic ($70Li_2S.30P_2S_5$) based materials or their mixtures. In one or more embodiments, the electrolyte may comprise a solid or gel based polymer electrolyte having PEO (poly ethylene oxide), PPO (poly propylene oxide), PAN (poly acrylonitrile), PMMA (poly methyl methacrylate), PVC (poly vinyl chloride), PVDF (poly vinylidene fluoride), PVDF-HFP (poly vinylidene fluoride-hexafluoropropylene) or their mixtures.

While the foregoing examples of electrolytes are largely based on lithium-based salts, those skilled in the art will understand that lithium-based salts can be replaced with appropriate non-lithium-based salts.

Broadly, an electrolyte of the present disclosure may have a salt concentration in a range of about 0.1M to about 10M, while in some embodiments the salt concentration may be desired in a range of about 1M to about 5M, and in other embodiments the salt concentration may be desired in a range of about 2M to about 3M.

The example secondary battery 700 also includes a positive terminal 724 electrically connected to each of the cathodes 720 via corresponding electrodes 728(1) to 728(5). Similarly, the lithium-metal battery further includes a negative terminal 732 electrically connected to the tabs 708A of the anodes 708 via corresponding electrodes 736(1) to 736(4).

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

In some aspects, the present disclosure is directed to an anode for an electrochemical device. The anode includes a current collector having a thickness and an active region, wherein the active region has first and second sides on opposite sides of the thickness; a first metal foil secured to the current collector on the first side of the active region; and a first electrically conductive layer between the current collector and the first metal foil, wherein the first electrically conductive layer secures the first metal foil to the current collector.

In one or more embodiments of the anode, the first electrically conductive layer comprises an electrically-conductive-carbon layer.

In one or more embodiments of the anode, the electrically-conductive-carbon layer consists essentially of electrically-conductive-carbon particles and a binder.

In one or more embodiments of the anode, the electrically-conductive-carbon particles are present in an amount of about 70 wt. % to about 90 wt. % of the electrically-conductive-carbon layer.

In one or more embodiments of the anode, the electrically conductive layer has a thickness in a range of about 0.1 μm to about 5 μm.

In one or more embodiments of the anode, the electrically conductive layer has a thickness in a range of about 0.5 μm to about 2 μm.

In one or more embodiments of the anode, the electrically conductive layer has a thickness of about 1 μm.

In one or more embodiments of the anode, the electrically conductive layer is present in an areal loading of about 0.1 g/m2 to about 2 g/m2.

In one or more embodiments of the anode, the current collector comprises copper, and the first metal foil comprises lithium.

In one or more embodiments of the anode, the current collector has a thickness in a range of about 4 μm to about 10 μm, and the first metal foil has a thickness in a range of about 15 μm to about 25 μm.

In one or more embodiments of the anode, the electrically-conductive layer consists essentially of electrically-conductive-carbon particles and a binder.

In one or more embodiments of the anode, the electrically-conductive-carbon particles are present in an amount of about 70 wt. % to about 90 wt. % of the electrically-conductive-carbon layer.

In one or more embodiments of the anode, the electrically conductive layer has a thickness in a range of about 0.1 μm to about 5 μm.

In one or more embodiments of the anode, the electrically conductive layer has a thickness in a range of about 0.5 μm to about 2 μm.

In one or more embodiments of the anode, the electrically conductive layer has a thickness of about 1 μm.

In one or more embodiments of the anode, the electrically conductive layer is present in an areal loading of about 0.1 g/m2 to about 2 g/m2.

In one or more embodiments of the anode, the anode includes a second metal foil secured to the current collector on the second side of the active region; and a second electrically conductive layer between the current collector and the second metal foil, wherein the second electrically conductive layer secures the second metal foil to the current collector.

In some aspects, the present disclosure is directed to an electrochemical device comprising a cathode, an electrolyte, and an anode of any one of the anodes recited herein.

Exemplary embodiments have been disclosed above and illustrated in the accompanying drawings. It will be understood by those skilled in the art that various changes, omissions and additions may be made to that which is specifically disclosed herein without departing from the spirit and scope of the present disclosure.

What is claimed is:

1. A method of forming anodes for one or more electrochemical devices, wherein each of the anodes has an electrical tab, the method comprising:
   providing a current-collector web;
   laminating, on a first side of the current-collector web, a metal foil to the current-collector web as multiple anode-active-material patches spaced from one another so as to provide a webbed anode precursor that includes the anode-active-material patches and inter-patch regions not containing the metal foil;
   forming the anodes from the webbed anode precursor so that each anode is formed from a respective anode region of a corresponding anode-active-material patch and the electrical tab corresponding to the each anode is formed from one of the inter-patch regions, wherein forming the anodes includes separating each anodes from the webbed anode precursor; and
   prior to laminating the metal foil to the current-collector web, applying an electrically conductive coating at each locating where the metal foil will be secured to the current-collector web and not applying the electrically conductive coating at each inter-patch region so as to form an electrically-conductive-coating patch corresponding to a respective one of the anode-active-material patches.

2. The method of claim 1, wherein the electrically conductive coating comprises electrically conductive particles and a binder.

3. The method of claim 2, wherein the electrically conductive particles comprise electrically conductive carbon particles.

4. The method of claim 3, wherein the binder is selected from the group consisting of poly vinylidene fluoride, poly vinylidene fluoride-hexafluoropropylene, carboxymethyl cellulose, styrene-butadiene rubber, and any mixture thereof.

5. The method of claim 1, wherein the electrically conductive coating consist essentially of a binder and conductive-carbon particles in an amount of about 70 wt. % to about 90 wt. % of the electrically conductive coating.

6. The method of claim 1, wherein applying the electrically conductive coating includes applying the electrically conductive coating so as to have a cured thickness of about 0.1 μm to about 5 μm.

7. The method of claim 1, wherein applying the electrically conductive coating includes applying the electrically conductive coating so as to have a cured thickness of about 0.5 μm to about 2 μm.

8. The method of claim 1, wherein applying the electrically conductive coating includes applying the electrically conductive coating so as to have a cured thickness of about 1 μm.

9. The method of claim 1, wherein the metal foil is provided in sheets, and the method further comprises using the conductive-coating patches to align the sheets of the metal foil with the conductive-coating patches in conjunction with the laminating of the metal foil to the current-collector web.

10. The method of claim 9, wherein using the conductive-coating patches to align the sheets of the metal foil with the conductive-coating patches includes using an optical detector to detect an edge of each of the conductive-coating patches.

11. The method of claim 1, wherein each conductive-coating patch has a size and a shape and the corresponding anode-active-material patch is in registration with a respective one of the conductive-coating patches and has a size and a shape substantially the same as the size and the shape of the respective one of the conductive-coating patches.

12. The method of claim 1, wherein the current-collector web has a width and a length, and the anode-active-material patches are spaced apart from one another along the length of the current-collector web with the inter-patch regions located therebetween.

13. The method of claim 12, wherein each of the anode-active-material patches has a width in the same direction as the width of the current-collector web, and the width of each of the anode-active-materials is at least about 95% of the width of the current-collector web.

14. The method of claim 1, wherein each electrical tab has a tab length, and the method further comprising spacing ones of the anode-active-material patches from one another by a minimum distance equal to or greater than the tab length.

15. The method of claim 1, wherein the method is performed in a roll-to-roll process and the current-collector web is provided in a continuous ribbon.

16. The method of claim 1, further comprising securing, on a second side of the current-collector web opposite the first side, additional metal foil to the current-collector web as reverse-side multiple anode-active-material patches spaced from one another and in registration with corresponding ones of the anode-active-material patches on the first side of the current-collector web.

17. The method of claim 1, wherein each anode has an active area, and the method further comprises sizing a corresponding one of the anode-active-material patches to have an area at least equal to the active area of the anode.

18. The method of claim 1, wherein the anodes are formed in a 1:1 ratio relative to the anode-active-material patches.

19. The method of claim 1, wherein the anodes are formed in a 2:1 ratio relative to the anode-active-material patches.

20. The method of claim 1, wherein each inter-patch region is used to form only a single electrical tab of a corresponding one of the anodes.

21. The method of claim 1, wherein each inter-patch region is used to form at least two electrical tabs corresponding, respectively, to the ones of the anode-active-material patches defining that inter-patch region.

22. The method of claim 1, wherein the metal foil comprises lithium, and at least some of the anodes each have a width of at least 20 mm and a length of at least 120 mm.

23. The method of claim 22, wherein the current-collector web comprises copper.

24. The method of claim 22, wherein the metal foil comprises lithium, and at least some of the anodes each have a width of at least 50 mm and a length of at least 150 mm.

25. The method of claim 1, wherein the current-collector web comprises a solid metal foil.

26. The method of claim 1, wherein the current-collector web comprises a perforated metal foil.

27. The method of claim 1, wherein the current-collector web comprises a metal mesh.

28. The method of claim 1, wherein the current-collector web has a thickness in a range of about 4 μm to about 10 μm.

29. The method of claim 28, wherein the each anode-active-material patch has a thickness in a range of about 15 μm to about 25 μm.

* * * * *

UNITED STATES PATENT AND TRADEMARK OFFICE
CERTIFICATE OF CORRECTION

PATENT NO. : 11,271,212 B1
APPLICATION NO. : 17/314797
DATED : March 8, 2022
INVENTOR(S) : Arunkumar Tiruvannamalai et al.

It is certified that error appears in the above-identified patent and that said Letters Patent is hereby corrected as shown below:

In the Claims

In Column 20, Line 55, Claim 1, the words "each anodes" should be replaced with the words "each anode".

In Column 20, Line 59, Claim 1, the word "locating" should be replaced with the word "location".

Signed and Sealed this
Third Day of May, 2022

Katherine Kelly Vidal
*Director of the United States Patent and Trademark Office*